United States Patent [19]

Gravley et al.

[11] Patent Number: 4,623,521

[45] Date of Patent: Nov. 18, 1986

[54] CARBON BLACK REACTOR

[75] Inventors: Mark L. Gravley; Mark E. Kertok, both of Bartlesville, Okla.

[73] Assignee: Phillips Petroleum Company, Bartlesville, Okla.

[21] Appl. No.: 781,617

[22] Filed: Sep. 30, 1985

[51] Int. Cl.[4] ............................................. C09C 1/48
[52] U.S. Cl. .................................... 422/156; 138/37; 138/46; 366/307; 366/336; 366/337; 366/338; 422/150; 422/224; 422/310; 423/450; 431/182; 431/184; 431/185
[58] Field of Search ............... 422/150, 151, 156, 157, 422/310, 158, 224; 423/449, 450; 138/37, 45, 46; 431/182, 183, 184, 185; 366/306, 337, 338, 339, 307, 336

[56] References Cited

U.S. PATENT DOCUMENTS

| | | | |
|---|---|---|---|
| 2,669,296 | 2/1954 | Stillman et al. | 431/184 |
| 2,735,664 | 2/1956 | Gamble | 138/45 |
| 3,087,796 | 4/1963 | Latham, Jr. et al. | 422/150 |
| 4,198,469 | 4/1980 | Dahmen et al. | 423/455 |
| 4,483,841 | 11/1984 | King | 422/150 |
| 4,516,606 | 5/1985 | Worley | 138/46 |

*Primary Examiner*—Michael S. Marcus
*Attorney, Agent, or Firm*—A. W. Umphlett

[57] ABSTRACT

Vanes operatively attached to external sleeves are provided in a conduit to implement on the outside of the conduit change in the swirl angle of incoming fluids.

11 Claims, 7 Drawing Figures

CARBON BLACK REACTOR

This invention relates to altering flow patterns within a conduit. In one of its aspects it relates to swirl vanes. In a more particular aspect it relates to swirl vanes of variable configuration. In another particular aspect it relates to the use of variable configuration swirl vanes in carbon black reactors. In another aspect, it relates to a fuel burner assembly in a reactor. It most particularly relates to a fuel burner assembly in a carbon black reactor. In another aspect, it relates to controlling the movement of gases through an annular spaced. In a more specific aspect of the invention, it relates to imparting a swirling motion to air and combustion products flowing in a conduit, most particularly in a carbon black reactor.

Carbon black is commonly produced by the pyrolytic decomposition of hydrocarbons. The heat for this decomposition is usually provided by the combustion of fuel, combustion gas and air. The hydrocarbon feed used can be a gaseous hydrocarbon or a normally liquid hydrocarbon.

It is known in the art that a furnace type carbon black, which can be used as an important ingredient in a rubber, both for tire treads and tire carcasses, can be produced by contacting the hydrocarbon with hot combustion gases in a tubular or essentially cylindrical reactor. Such a reactor generally comprises a steel shell with a refractory lining made from, for example, ceramic material.

Several parameters influence the properties of carbon black thus produced. Flow velocities, air to hydrocarbon ratio, gas to hydrcarbon ratio, reactor shape, turbulence of the reaction mass, etc., are important parameters. The change of any of these parameters changes the properties of the carbon black considerably.

In order to change some of the parameters it has been proposed to impart turbulence to the reaction mass by tangential air entries into the carbon black reactor, or by employing fixed and rigid metal vanes to provide spiraling configurations and velocities for the air and combustion products flowing in a carbon black reactor.

While the above described modifications, which increase turbulence by increasing the mixing rate of the reaction mass, have proved effective for controlling the properties of furnace type carbon black, they are subject to certain limitations. For instance, if a change in turbulence is desired in a reactor having fixed vanes, it is necessary to shut down and partially disassemble the reactor in order to change the swirl configuration. The present invention has the great advantage of allowing adjustment of the swirl configuration from outside the reactor.

Advancing from the specific to the more general, it is easily seen that the concept of this invention is applicable to any process in which the ability to change the mixing pattern of fluids, or even fluid and particulate matter, flowing in a conduit is advantageous.

The object of this invention is to provide apparatus for adjusting the swirl motion of fluids in a conduit. Another object of this invention is to provide the desired degree of mixing by adjusting turbulence of combustion products in a reactor. A further object is to provide a process applicable to the preparation of various grades of furnace black in high yield and of consistent quality. Other objects will become apparent from the following disclosure.

SUMMARY OF THE INVENTION

According to the present invention, a conduit is provided with at least one sleeve means filled with a pressure tight seal around the outside of the conduit with at least one vane means attached to the inside of the sleeve means though an opening in the conduit wall so that movement of the sleeve alters the position of the vane within the conduit.

According to one embodiment of this invention a solid, flexible strip is attached near the terminus of one of its edges to a sleeve means that is concentric with a conduit. The same edge of the flexible strip is attached to the wall of the conduit near the other terminus of that edge so that rotation of the sleeve around the center line of the conduit flexes the strip so that the flow path of fluid passing through the conduit can be altered.

In accordance with another embodiment of the invention, multiple overlapping vane means are used. In this embodiment, each vane can be either rotated separately or in conjunction with the other vanes by the use of multiple sleeves.

In accordance with the instant invention, a reactor is provided with an adjustable vane means which can be used to impart turbulence to the feedstream entering the reactor. These adjustable vanes means are particularly suited for use in a carbon black reactor. The vanes are adjustable by means of a rotating sleeve connected to the sidewall of the reactor.

Another related embodiment of this invention is a method of controlling the yield or consistency of carbon black using the above described adjustable vane means.

DETAILED DESCRIPTION OF THE INVENTION

According to the instant invention, adjustable swirl vanes are provided to permit a change in swirl angle from the outside of a conduit or in the more particular case of a carbon black reactor without shutting down the furnace. Such a change in swirling might be desired for flame stability or to increase turbulence so as to increase the mixing rate. The attached Figures show some possible constructions.

The device is made up of at least two conduits, one of which can be described as a sleeve, which are coaxial and rotatable relative to each other. Each sleeve is fitted around the conduit to provide a pressure tight seal with the conduit. A method of accomplishing this is to have a single conduit segmented and have a rotatable sleeve attaching the two segments. In another arrangement a multiplicity of interlocking sleeves can be used to join segments of a conduit. In yet another method, the single conduit can be slotted, with the sleeve sealing the slots.

The rotatable conduit or sleeve is secured to the supply conduit in any conventional manner, the requirements being that the rotatable conduit be able to rotate around the supply conduit and that the rotatable conduit be sealed so that the fluid used in the conduit does not escape. A set screw can be provided to prevent unwanted movement of the rotatable conduit. Any other means can be provided to fix the rotatable conduit in the desired position.

A vane can be a continuous strip of flexible, light sheet material. As one end of the conduit is rotated relative to the other, the vane, which is originally parallel with the conduit, is warped to form a helical path for the fluid. The swirl angle is, therefore, a function of the relative rotation of the conduit.

A vane used in this invention can be made of any material that remains flexible and retains its integrity under the conditions to which the conduit is subjected. Typical materials used for vanes include carbon steel, and from 10-28 gage sheet metal.

The vanes are generally rectangular in shape but can also be triangular or any other flat shape. They can also be formed into other shapes, such as "Y" or "S" shaped. They generally have a length to width ratio ranging from about 5:1 to about 50:1. The length of the vanes can range from about 6 inches to about 36 inches in length, but in general can range to whatever suitable length is necessary for the reactor in use.

Figure 1:
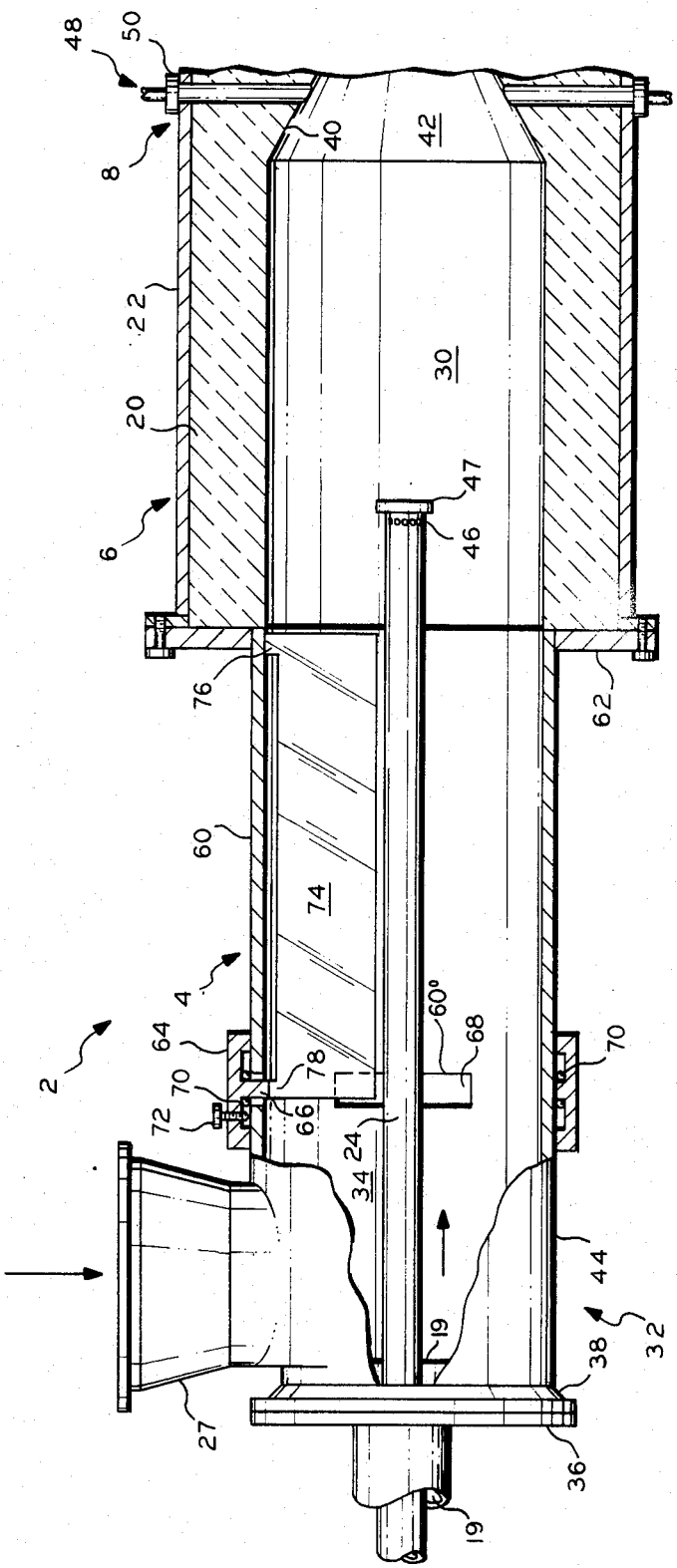
FIG. 1 is an elevation view of a carbon black reactor, partly in cross section, showing the invention.

The vanes can be attached to the conduits in any conventional manner known in the art. In a preferred embodiment the vanes contain tabs which can be fixed to finger segments which extend through slots in the conduit wall as shown in FIG. 1.

In the embodiment of the invention that employs a single strip attached to both the conduit and the sleeve, the vanes must be able to flex with the movement of the rotatable conduit or sleeve without permanent deformation. The angle of flex will be dependent on the material from which the vane is constructed and on the shape and size of the vane. For some combinations of material and shape the angle can range up to about 90° in either direction. When a multiplicity of vanes are used within a section of conduit each vane should be proportionally spaced around the conduit. For instance, if four vanes are used they should be evenly spaced 90° from one another. Any multiple of vanes and conduits can be used in the instant invention.

The vanes can vary in width from less than half the radius of the conduit up to nearly the diameter of the conduit. In the preferred embodiment the vane width is less than half of the diameter of the conduit. This provides for the insertion of other vanes and also allows, in a preferred embodiment, for the use of a concentric pipe supplying fuel through the conduit to a reactor, as shown in FIG. 1.

The vanes provided in a carbon black reactor must also be able to withstand the temperatures present in the reactor. Generally vanes which can be exposed to about 1200° F. without damage will be suitable for a carbon black reactor.

In the operation of the most preferred embodiment of the instant invention, combustion oil or hydrocarbon is provided to a reactor through an inner pipe centered on the center line of the conduit. Air and combustion gases enter through the conduit surrounding the oil pipe and flow past the vane or vanes present in the conduit. Depending on the amount of rotation of the rotatable conduit, the flexible vane or vanes impart a swirl to the air or combustion gases which passes through the conduit and into the reaction chamber. There the combustion gases or air combine with the oil or hydrocarbon to form carbon black.

Referring to FIG. 1, a preferred embodiment of this invention involves an apparatus for producing carbon black comprising serially arranged: a housing 32, a fuel burner assembly 4, a combustion zone 6, a mixing zone 8, and a reaction zone (not shown).

The combustion zone 6 comprises a generally tubular configuration surrounded by a high temperature refractory liner 20 which is provided with an outer steel shell or casing 22. Both ends of a combustion zone 30 are open. The downstream end communicates with the mixing zone 8, which comprises a sidewall 40 formed of refractory material defining a chamber 42 in axial alignment with and converging from the combustion chamber 30 to a throat not shown. Injector means 48 are provided for introducing a carbonaceous feedstock through the sidewall 40 and into a converging chamber 42. Preferably, the converging chamber 42 converges from an inlet having a diameter about the same as that of the combustion chamber 30, and converges at a half-angle of about 18°. The means 48 comprises one or more sets of ports 50 which open into the chamber 42. Usually, the ports will be circumferentially spaced about the converging chamber at a selected positions, with the ports being preferably equidistantly spaced from each other around the circumference of the chamber for uniform distribution of feedstock from the ports 50 and into the converging zone 42. The upstream end of the combustion chamber 30 communicates via the fuel burner assembly 4, with the housing 32 through which an oxidant fluid such as air is introduced into the combustion chamber 30.

The housing 32 can be formed from metal, such as steel and comprises a generally tubular sidewall 44 so that the chamber 34 is generally cylindrical and preferably in axial alignment as it extends from the fuel burner assembly 4. A tubular member 24 extends through the chamber 34 axially and empties into the combustion chamber 30 through a plurality of radially outwardly directed ports or orifices 46 passing through the sidewall of the tubular member 24. A bluff body, preferably an annular flange 47 is attached to the tubular member 24, slightly downstream of the ports 36 to aid in maintaining stable combustion. In the preferred embodiment the tubular member 24 carries the combustible gas which is mixed with the oxidant fluid from the chamber 34 into the combustion chamber 30. The housing 32 is closed at its upstream end by a plate 36 affixed to a flange 38 which circumscribes the upstream end of the housing 32. The tubular member 24 enters the chamber 34 in an axial direction through the plate 36. An annulus 19 defined between the plate 36 and the tubular member 24 provides a passageway for the introduction of a coolant, such as air, into the chamber 34 to protect the metal components near flange 38 from high temperatures. A duct 27 opens into the chamber 34 through the sidewall 44.

Preferably the fuel burner assembly 4 comprises a generally tubular zone in axial alignment with the combustion chamber 30 and the chamber 34. The fuel burner assembly 4 can be formed from metal such as steel and comprises a generally tubular sidewall 60 having an annular flange 62 at its downstream end for sealably connecting to the metal shell 22 of the combustion zone 6.

The upstream end of the fuel burner assembly, according to a preferred embodiment of this invention, is provided with a metal sleeve 64 having a concentrically attached finger segment 66 projecting inwardly from the perimeter of the sleeve 64 for mating with a slot 68 in the sidewall 60, whereby the sleeve 64 can be rotated about 60° from a non-rotated position. For ease of assembly the sleeve 64 can be formed from two semicircular segments which can be joined, for example, by bolting or welding. Requirements for the sleeve 64 include that it be rotatable around the sidewall 60 and be sealed to prevent leakage of gases. Sealing means 70, comprising a high temperature packing material, is provided around the perimeter of shell 60 on both sides of finger 66. Also provided is a set screw 72 for holding the sleeve 64 in a desired position.

FIG. 1 illustrates a single swirl vane 74 mounted in the fuel burner assembly 4 in its non-rotated position. The swirl vane 74 can be formed of a continuous strip of a flexible sheet of metal that will retain its shape under the conditions of the reactor. A typical material for the swirl vane 74 is 310 stainless steel of about 16 to about 28 gage. The swirl vane 74 illustrated in FIG. 1 in its non-rotated position is straight and the lengthwise edges of the vane are aligned with the axis of the fuel burner assembly 4. The vane 74 can extend inwardly from the sidewall 60 part way to the center of the fuel burner assembly 4, leaving space for a tubular member 24 as shown in FIG. 1. The vane 74 is fixed at the downstream end to the sidewall 60 at a first tab porton 76, for example, by welding.

Figure 2:
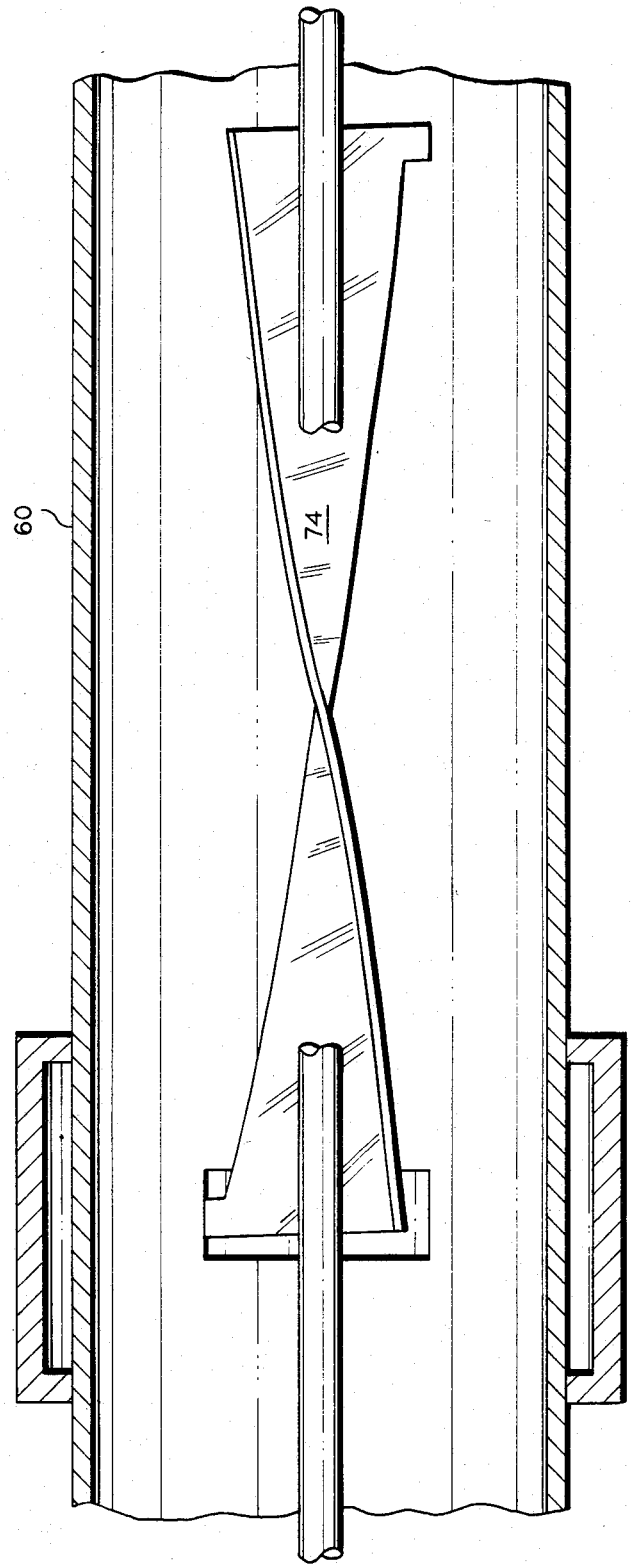
FIG. 2 is a cross-sectional elevation view of the fuel burner assembly taken along lines 2—2 of FIG. 4 showing one vane in a rotated position.
Figure 3:
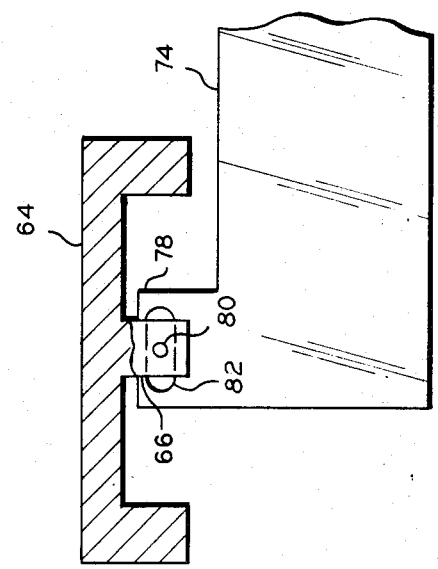
FIG. 3 is a cross-sectional detail view illustrating the attachment of the vane 74 to the finger 66.

As illustrated in the preferred embodiment, shown in FIG. 3, the upstream end of the vane 74 is slideably attached at a second tab portion 78 to the finger 66, by way of a pin 80 passing through a slot 82 in tab portion 78. As the sleeve 64 is rotated, the swirl vane 74 is twisted from its non-rotated straight shape to form a helical path for the fluid supplied from duct 27 to chamber 34 which passes through the fuel burner assembly 4 into combustion chamber 30. FIG. 2 illustrates a single vane 74 mounted in the fuel burner assembly 4 with the collar 64 rotated counter clockwise.

Figure 4:
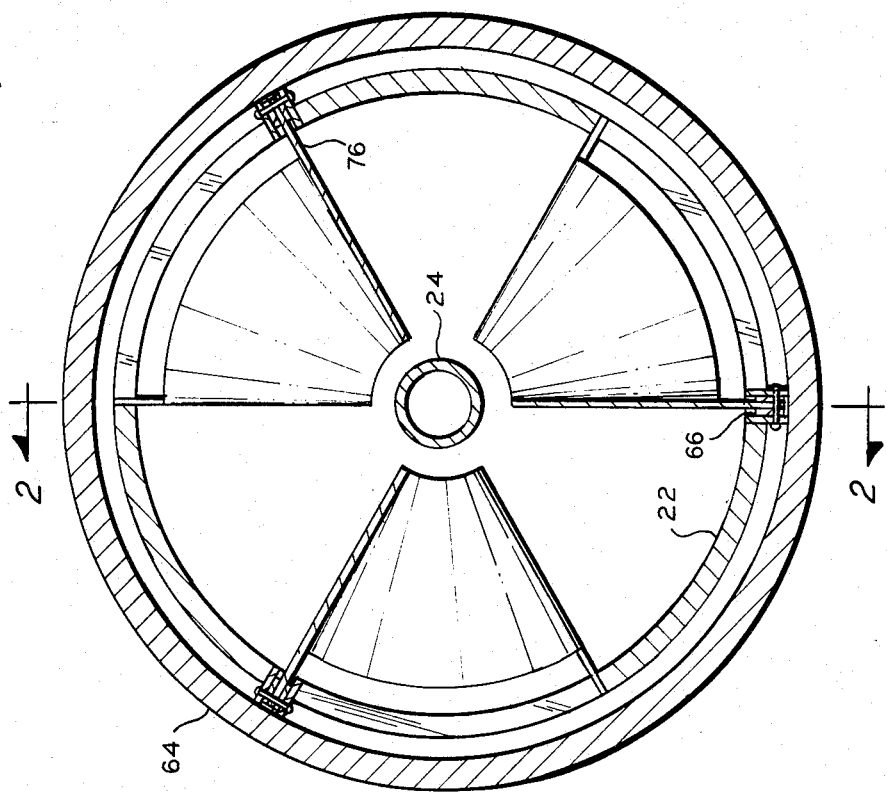
FIG. 4 is a cross-sectional end view of the fuel burner assembly illustrating 3 vanes in a rotated position.

The invention encompasses the use of a plurality of vanes to provide flexibility in changing the operating conditions of the reactor. FIG. 4 illustrates three vanes in a rotated position. Any number of vanes may be employed as desired.

Figure 5:
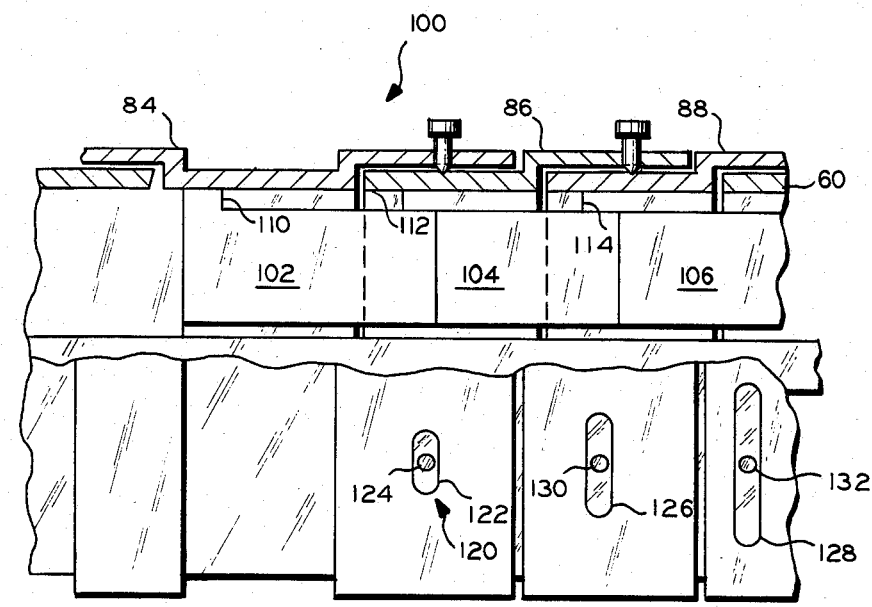
FIG. 5 is an elevation view of a fuel burner assembly, partly in cross section, illustrating an embodiment of the invention.
Figure 6:
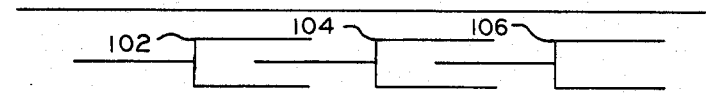
FIG. 6 is a schematic plan view illustrating the vanes shown in FIG. 5 in a non-rotated position.
Figure 7:
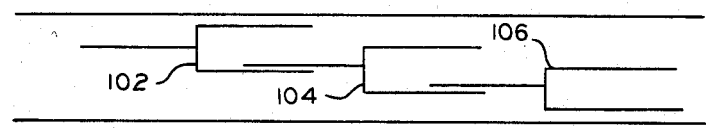
FIG. 7 is a schematic view illustrating the vanes shown in FIG. 5 in a rotated position.

In another embodiment of the invention, shown in FIG. 5, a fuel burner assembly 100 comprises segmented sections 84, 86 and 88. The vanes 102, 104 and 106 employed in this embodiment are also formed of sheet metal that will retain its shape under reactor conditions, and are formed in the shape of a two tined fork when viewed from an edge of the sheet metal as illustrated in FIGS. 6 and 7. The "handle" and "tines" of each fork, as shown in FIG. 5, usually will extend into the conduit up to a distance that equals to radius of the conduit. The distance can, however, be more or, particularly if an axially oriented pipe is present as in FIG. 1, the distance can be less than the radius of the conduit.

The vanes 102, 104 and 106 are fixed to the segments 84, 86 and 88 respectively at tab portions 110, 112 and 114, and are arranged to overlap as illustrated in FIGS. 5, 6 and 7.

Each of segments 84, 86 and 88 is rotatable over a limited range. Rotation limiting means 120 for segment 84 comprises a slot 122 in segment 84 for receiving a pin 124 fixed to segment 86. Similarly rotation limiting means is provided for segments 86 by slot 126 in segment 86 and pin 130 fixed to segment 88, and for segment 88 by slot 128 in segment 88 and pin 132 fixed to sidewall 60. As illustrated in FIGS. 6 and 7 the rotation of segment 86 is limited by the distance each "handle" can travel within the confines of the encompassing "tines" of the adjacent fork. The actual distance depends on the dimensions of the forks. Note, however, that the rotation of the sleeve can align the forks to provide a swirl to fluid passing through the conduit with an added effect of eddying of the fluid against the shoulders formed at the edge at which the "handle" attaches to the "tine" portion of the fork.

While the invention has been described and shown in only two preferred embodiments thereof, many variations will be suggested to those skilled in the art. The foregoing description should, therefore, not be considered as limiting, and all such variations and modifications as are in accord with the principles described are meant to fall within the scope of the appended claims.

We claim:

1. An apparatus for altering the flow of fluid through a conduit said apparatus comprising:
   (a) a cylindrical conduit suitable for conducting fluid flow therethrough, said conduit having an inside and an outside surface,
   (b) at least one sleeve means fitted with a pressure tight seal around said outside surface of said conduit, and
   (c) at least one flexible vane means within said conduit, each one of said vane means comprising a flexible strip with one edge of said strip aligned adjacent to and lengthwise along said conduit, one terminus end of said edge attached to an inside surface of said sleeve through an opening in a circumferentially wall of said conduit, said opening of sufficient dimensions so that rotation of said sleeve means about said conduit alters the position of said vane means within said conduit thereby affecting the flow of fluid through said conduit, and another terminus end of said strip fixed to the inside surface of said conduit, said strip extending radially inwardly from said edge into said conduit.

2. An apparatus according to claim 1 wherein said flexible strip has a width equal to or less than a radius of the conduit.

3. An apparatus according to claim 1 wherein said flexible strip has a length to width ratio ranging from about 5:1 to about 50:1.

4. An apparatus according to claim 1 wherein multiple flexible strips are present.

5. An apparatus according to claim 4 wherein multiple rotatable sleeve means are present.

6. An apparatus according to claim 4 wherein said flexible strip has a length ranging from about 6 to about 36 inches.

7. An apparatus according to claim 4 wherein four flexible strips are present, spaced at 90° angles from each other along the inner surface of said conduit.

8. An apparatus according to claim 4 where three flexible strips are present, spaced at 120° intervals from each other along the inner surface of said conduit.

9. A carbon black reactor having in sequential disposition means defining a burner assembly, a combustion zone, a mixing zone and a reaction zone, said burner assembly having an apparatus for altering flow according to claim 1.

10. An apparatus for altering the flow of fluid through a conduit said apparatus comprising:
  (a) a cylindrical conduit suitable for conducting fluid flow therethrough, said conduit having an inside and an outside surface and having a plurality of serially disposed openings in a circumferential wall of said conduit;
  (b) a plurality of serially disposed sleeve means fitted with a pressure tight seal around said outside surface of said conduit, and
  (c) a plurality of vane means within said conduit each one said plurality of vane means attached to an inside surface of said sleeve means through said openings in the circumferential wall of said conduit, said openings of sufficient dimensions so that rotation of said sleeve means about said conduit alters the position of said vane means within said conduit thereby affecting the flow of fluid through said conduit wherein said vane means is formed in the shape of a two tined fork with a handle, said vane means attached to said sleeve means at the handle end of said fork wherein said vane means are arranged to overlap with the handle of each downstream vane means between the tines of an immediately upstream vane.

11. A carbon black reactor having in sequential disposition means defining a burner assembly, a combustion zone, a mixing zone and a reactor zone, said burner assembly having an apparatus for altering flow according to claim 10.

* * * * *